(12) United States Patent
Sugai

(10) Patent No.: US 6,265,356 B1
(45) Date of Patent: Jul. 24, 2001

(54) GRANULES OF RAW MATERIAL FOR FRICTION MATERIAL AND METHOD OF MANUFACTURING THE SAME

(75) Inventor: Yoshiyuki Sugai, Osaka (JP)

(73) Assignees: Akebono Brake Industry, Co., LTD, Tokyo; Akebono Research and Development Centre Ltd., Hanyu, both of (JP)

( * ) Notice: Subject to any disclaimer, the term of this patent is extended or adjusted under 35 U.S.C. 154(b) by 0 days.

(21) Appl. No.: 09/185,072

(22) Filed: Nov. 3, 1998

(30) Foreign Application Priority Data

Nov. 4, 1997 (JP) .................................................. 9-302032

(51) Int. Cl.$^7$ .............................................. C10M 103/00
(52) U.S. Cl. .......................................................... 508/100
(58) Field of Search .................................... 508/109, 100, 508/103, 105, 108

(56) References Cited

U.S. PATENT DOCUMENTS

| | | | |
|---|---|---|---|
| 3,808,130 | * 4/1974 | Schiefer | 508/106 |
| 3,926,818 | * 12/1975 | Albertson | 252/12.4 |
| 4,382,998 | * 5/1983 | Stengle | 428/450 |
| 4,384,054 | 5/1983 | Moraw et al. | 523/156 |
| 4,548,617 | 10/1985 | Miyatani et al. | 57/293 |
| 4,663,060 | * 5/1987 | Holinski | 506/108 |
| 4,678,818 | * 7/1987 | Nakagawa | 523/157 |
| 5,427,698 | * 6/1995 | Hirokawa | 252/12.4 |
| 5,856,278 | * 1/1999 | Brewer | 508/105 |

FOREIGN PATENT DOCUMENTS

| | | |
|---|---|---|
| 2 239 102 | 2/1974 | (DE) . |
| 0 415 459 | 3/1991 | (EP) . |
| 0 594 172 | 4/1994 | (EP) . |
| 0 833 072 | 4/1998 | (EP) . |
| 2 056 293 | 3/1981 | (GB) . |
| 7-116303 | 11/1988 | (JP) . |
| 10212417 | * 8/1998 | (JP) . |

* cited by examiner

Primary Examiner—Margaret Medley
Assistant Examiner—Cephia D. Toomer
(74) Attorney, Agent, or Firm—Finnegan, Henderson, Farabow, Garrett & Dunner, L.L.P.

(57) ABSTRACT

Starting material containing raw material fiber, raw material powder and binder for manufacturing friction material is granulated, so that primary granules are made, and then the primary granules are crushed so as to obtain granules of raw material for manufacturing friction material.

10 Claims, 1 Drawing Sheet

GRANULES OF RAW MATERIAL FOR FRICTION MATERIAL AND METHOD OF MANUFACTURING THE SAME

BACKGROUND OF THE INVENTION

1. Field of the Invention

The present invention relates to granules suitable for manufacturing friction material used for brakes and clutches incorporated into various vehicles and industrial machines. Also, the present invention relates to a method of manufacturing the granules.

2. Description of the Related Art

Friction material widely used for brake pads, brake linings and clutch facings incorporated into various vehicles and industrial machines is manufactured as follows. Starting raw material containing raw material fiber such as heat-resistant organic fiber, inorganic fiber and metal fiber, and also containing raw material powder such as inorganic and organic filler, friction modifier and thermosetting resin binder is formed at a room temperature by a predetermined pressure (preforming) and then heat-formed at a predetermined temperature. Then it is cured (after-cure) and finished.

In the process in which the starting raw material is mixed and measured and then the measured material is charged into a die for heat-forming, powder (mixture) is handled, the shape of which is changeable. In many cases, raw material powder comprises fine particles, the diameters of which are several tens $\mu$m, for the reasons of ensuring the frictional characteristic of the frictional material. Therefore, each process tends to be dusty when the material is handled. Accordingly, it is necessary to take countermeasure to prevent dust from rising, for example, it is necessary to arrange a shielding plate in each process. When the countermeasure is taken as described above, the manufacturing cost is increased. Further, the raw material powder is composed of fine particles, the specific surface of which is large. Therefore, the raw material powder tends to adhere onto an inner surface of the forming die. Accordingly, it becomes difficult to charge the starting raw material into the forming die uniformly.

In order to solve the above problems, the starting raw material is granulated. That is, various raw material powder and raw material fiber, which are the starting raw material, are rolled while binder is being added to them, so that granules, the diameter of which are 2 to 5 mm, can be obtained, and these granules are used as material for manufacturing friction material.

When raw material powder is granulated, it is possible to solve the above problem of dust which rises in the process of handling and it is also possible to solve the above problem of adhesion of raw material powder onto the inner surfaces of the forming die.

Raw material fiber is originally added for enhancing the mechanical strength of friction material when the raw material fiber is dispersed entirely and uniformly and entangled with each other. However, according to a method by which material is granulated, raw material fiber is involved in the granules and divided for each granule. Therefore, it is impossible for the raw material fiber to get entangled with each other. As a result, the reinforcement effect, which is the most important, is decreased, and it becomes impossible to provide the reinforcement effect in some cases.

Usually, granules are substantially spherical. When granules charged into a forming die are heat-formed at a predetermined temperature and pressure, it is difficult for each granule to be broken in the initial stage of heat-forming. Accordingly, there is a possibility that raw material of the friction material contained in granules is not sufficiently mixed with each other. As a result, uniformity of the friction material is deteriorated.

SUMMARY OF THE INVENTION

The present invention has been accomplished in view of the above circumstances. It is an object of the present invention to provide granules of raw material preferably used for manufacturing friction material handily at low cost without using a special apparatus.

The above object of the present invention can be accomplished by the granules of raw material used for manufacturing friction material described in the following item (1) and the method of manufacturing granules of raw material used for manufacturing friction material described in the following item (2).

(1) Granules of raw material used for manufacturing friction material obtained by crushing primary granules made by the granulation of starting raw material containing raw material fiber, raw material powder and binder for friction material.

(2) A method of manufacturing granules of raw material used for manufacturing friction material comprising the steps of: granulating starting raw material containing raw material fiber, raw material powder and binder for friction material so as to obtain primary granules; and crushing the primary granules.

In the granules of raw material used for manufacturing friction material obtained when the primary granules are crushed, which will be referred to as the secondary granules in this specification hereinafter, raw material powder is fixed onto the surface of raw material fiber by the binder and physical adsorption. Therefore, no raw material powder is disconnected from the surface of raw material fiber. On the other hand, the tensile strength of raw material fiber itself is high. Therefore, raw material fiber is seldom cut off even if it is given an external force, the intensity of which is sufficiently high to crush the primary granules. Accordingly, these secondary granules are obtained in such a changeable form that the raw material fiber holds the raw material powder and is exposed from the surface of the raw material powder.

When these secondary granules are used, it is possible to enhance the mechanical strength of the obtained friction material because the fiber material exposed from the surface of the raw material powder gets entangled with the raw material fiber of the adjacent secondary granules. In the secondary granules, a large number of protrusions of acute angles are formed in the process of crushing. Therefore, the secondary granules are easily broken in the initial stage of heat-forming, and the friction material is mixed with each other. As a result, it is possible to obtain friction material in which the raw material of friction material is uniformly dispersed. Further, shapes of the secondary granules are changeable and the sizes are changed variously. Accordingly, the forming die can be tightly filled with the secondary granules. Therefore, compared with a conventional case in which spherical granules are used, it is possible to obtain friction material of high density.

In the manufacturing process of the secondary granules, a series of processes including mixing, granulating and crushing of raw material can be conducted by the same mixer. Accordingly, no additional devices are required, and no cost is raised.

DETAILED DESCRIPTION OF THE PREFERRED EMBODIMENTS

Concerning the granules of raw material for manufacturing friction material of the present invention, that is, concerning the secondary granules, the detail will be explained referring to the manufacturing method.

Figure 1:
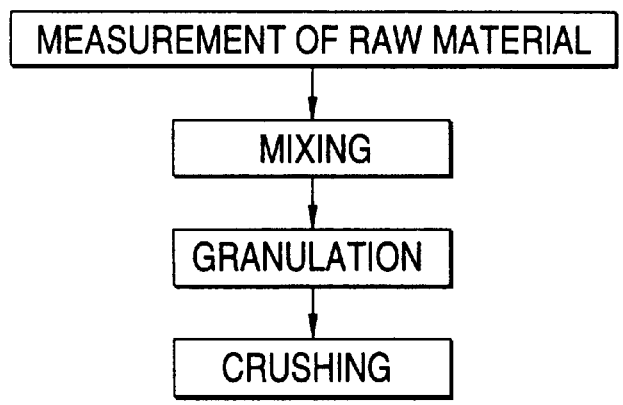
FIG. 1 is a flow chart showing a manufacturing process for manufacturing granules of raw material used for manufacturing friction material of the present invention.

As shown in the flow chart of FIG. 1, before the secondary granules are made, the primary granules are made in the first place. These primary granules can be made by the conventional granulating method as follows. Raw material fiber, raw material powder and binder are measured so that they can be provided by a predetermined ratio. The thus measured raw material fiber, raw material powder and binder are charged into a mixer so that they can be uniformly mixed with each other. In this way, the starting raw material is obtained. After that, a proper quantity of water is added to the starting raw material. Then, the starting raw material is rolled. In this way, the primary granules can be obtained.

Operating conditions of the mixing and granulation are different from each other depending upon a mixer to be used and a quantity of starting raw material. For example, an agitating type mixer is used which has a mixing tank, the capacity of which is 10 liters. Starting raw material of 2 kg is charged into the mixing tank, and rotary blades are rotated at 100 to 1000 rpm for 1 to 5 minutes. In this way, starting raw material of uniform quantity can be obtained. After water has been added to the starting raw material, it is rolled at 10 to 1000 rpm for 1 to 10 minutes. Due to the above operation, it is possible to obtain primary granules, the diameters of which are approximately 5 to 40 mm.

Raw material fibers are conventionally used for friction material. Examples of usable fiber materials are: metallic fiber made of steel, copper and brass; inorganic fiber such as carbon fiber, glass fiber and ceramic fiber of potassium titanate; and organic fiber such as aramid fiber and fire resistance acrylic fiber.

Raw material powders are conventionally used for friction material. Examples of usable raw material powders are: friction modifiers containing friction particles such as cashew dust and rubber dust, metal particles such as copper, sulphur, aluminum and zinc, or metal oxide such as alumina, silica and zirconia; solid lubricant such as graphite and molybdenum disulfide; scale-shaped substance such as vermiculite and mica; and filler such as barium sulfate and calcium carbonate.

Binders are conventionally used for friction material. Examples of usable binders are: binders made of thermosetting resin such as phenolic resin (including straight (not-modified) phenolic resin and rubber-modified phenolic resin or the like), melamine resin, epoxy resin, and cyanate ester resin. These binders may be either solid (powder) or liquid.

A compounding ratio of the above raw material fiber, raw material powder and binder is not particularly limited to a specific value. It is appropriately selected in accordance with the composition of a desired friction material.

Figure 2:
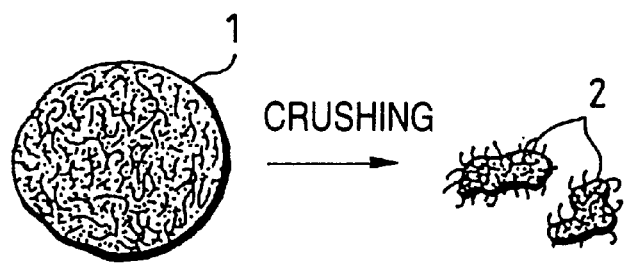
FIG. 2 is a schematic illustration showing a model of the manufacturing process for manufacturing granules of raw material used for manufacturing friction material of the present invention.

As shown in FIG. 2, the primary granule 1 obtained by the granulation is spherical. Most of raw material fiber is enclosed inside the primary granule 1. No raw material fiber extends from the surface to the outside of the primary granule 1.

Next, the primary granules 1 are crushed by the same mixer and changed into the secondary granules 2. Concerning the crushing method, it is possible to adopt various methods. It is simple and effective to adopt a method in which the rolling speed (rotating speed of the rotary blades of the apparatus) is increased faster than that in the case of granulating the primary granules 1 so that the primary granules can be made to collide with each other. Alternatively, it is simple and effective to adopt another method in which the primary granules 1 are cut and broken with the rotary blades, the profiles of which are formed to be sharp. Specifically, in the case of the above mixer, the rotating speed of the rotary blades is increased to 300 to 2000 rpm and mixing operation is conducted for 0.1 to 5 minutes.

Figure 3:
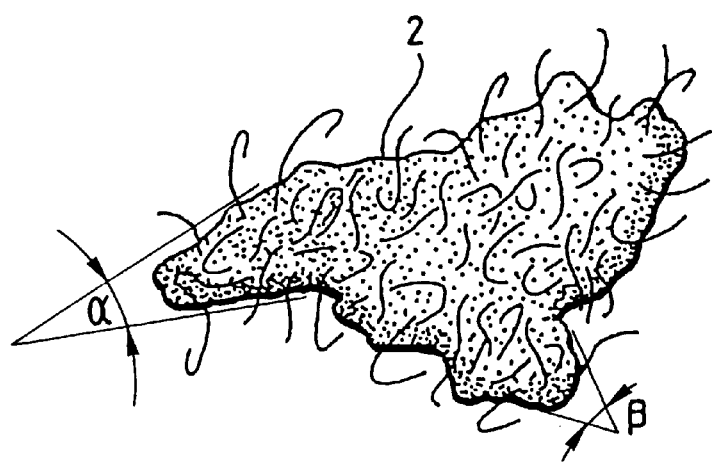
FIG. 3 is an enlarged view of the secondary granule shown in FIG. 2.

As shown in the enlarged view of FIG. 3, the thus obtained secondary granule 2 is composed as follows. It has a plurality of sharp protrusions, which are indicated by angles $\alpha$ and $\beta$ in the drawing, and further a large number of raw material fibers are extended from the surface to the outside of the secondary granule. The profile and size of the secondary granule are various.

In this connection, the granulation and crushing of the primary granules can be conducted by the same mixer. Therefore, it is unnecessary to provide a new manufacturing device, and no manufacturing cost is raised.

It is possible to manufacture friction material from the starting raw material of the above secondary granules 2. The manufacturing process will be explained as follows.

First, the secondary granules 2 are charged into the forming die. At this time, the profiles of the secondary granules 2 are changeable and the sizes are various. Therefore, it is possible to tightly charge the secondary granules 2 into the forming die at high density. Next, preliminary formation is conducted on the secondary granules 2 at a room temperature, so that a preformed of the friction material is made.

After that, a pressure plate is attached to the forming die and heat-forming is conducted. In this case, since the secondary granules 2 have a large number of sharp protrusions, they are easily broken in the initial stage of heat-forming and mixed with each other. Therefore, raw material of the friction material is uniformly dispersed in the forming die. At the same time, since the raw material fiber is exposed, it can easily get entangled with each other. Consequently, it is possible to obtain uniform friction material of high mechanical strength.

After heat-forming, after-cure and finishing are conducted so as to complete friction material.

The above conditions in the series of processes are not particularly limited. It is possible to conduct a common method, for example, preliminary formation may be conducted by the surface pressure of 100 to 500 kgf/cm$^2$, and heat-forming may be conducted by the surface pressure of 200 to 1000 kgf/cm$^2$ at 130 to 180° C. for 3 to 15 minutes, and after-cure may be conducted at 150 to 300° C. for 1 to 15 hours.

Referring to an example of the present invention and also referring to a comparative example, the present invention will be explained more specifically, however, it should be noted that the present invention is not limited to the specific example.

In this example, raw material powder contained 5 weight % of graphite, 20 weight % of barium sulfate, 30 weight % of calcium carbonate, and 15 weight % of friction particles (mixture of cashew dust and melamine dust). Raw material fiber of 20 weight % was a mixture containing aromatic polyamide fiber, copper fiber and glass fiber. Binder was phenolic resin of 10 weight %. Starting raw material of 2 kg, which contained the above raw material powder, the raw material fiber of 20 weight % and the phenolic resin of 10 weight %, was charged into a high speed agitating type mixer, the capacity of the mixing tank of which was 10 liters, and mixed for 7 minutes at the rotating speed 450 rpm of the rotary blades.

Next, a proper quantity of water was added into the mixing tank, and the rotary blades were rotated at 80 rpm for 3 minutes, so that the primary granules were made. These primary granules were spheres into which raw material fiber was taken.

After that, the rotating speed of the rotary blades was increased to 800 rpm and operation was continued for 2 minutes, so that the secondary granules were made. Appearance of the secondary granule is shown in the schematic illustration of FIG. 3. As shown in the drawing, the secondary granule had a large number of sharp protrusions and raw material fiber was exposed onto the surface of the secondary granule.

The thus obtained secondary granules were set in a hot press and heat-formed at 150° C for 10 minutes by the surface pressure of 500 kgf/cm$^2$. Next, the thus formed product was subjected to after-cure treatment at 200° C for 3 hours, so that friction material A was made.

In order to make a comparison, the aforementioned primary granules were subjected to the same treatment, so that friction material B was made.

Friction materials A and B, which were obtained in the manner described above, were subjected to a bending test and component analysis. As a result of the bending test, friction material A was superior to friction material B. The component analysis was conducted in such a manner that test pieces were taken from a plurality of arbitrary positions of each friction material and observed by a microscope. As a result of the component analysis, both raw material fiber and raw material powder were more uniformly dispersed in friction material A than friction material B.

According to the results of the bending test and component analysis, it was confirmed that friction material made of the secondary granules of the present invention was superior.

As explained above, when friction material is made of the secondary granules, it is possible to provide uniform friction material of uniform mechanical strength. Further, when the secondary granules are made, it is unnecessary to provide a specific manufacturing apparatus and process. Therefore, the manufacturing cost can be reduced.

What is claimed is:

1. Granules used for a friction material comprising:
    a fiber;
    a powder; and
    a binder;
    wherein the ratio of the fiber, the powder, and the binder in the granules is selected in accordance with a composition of the desired friction material and the shape of the granules include a plurality of protrusions of acute angles.

2. Granules used for manufacturing a friction material comprising:
    a fiber;
    a powder; and
    a binder;
    wherein the ratio of the fiber, the powder, and the binder in the granules is selected in accordance with a composition of the desired friction material and a plurality of fibers extend from a surface of each of the granules of raw material so as to enable entanglement of fibers of adjacent granules when the adjacent granules are compressed for manufacturing the friction material.

3. A method of manufacturing granules used for manufacturing a friction material comprising the steps of:
    mixing a fiber, a powder, and a binder so as to obtain a starting material wherein a compounding ratio of the fiber, the powder, and the binder is selected in accordance with a composition of the desired friction material;
    granulating the starting material, thereby obtaining primary granules; and
    crushing the primary granules so as to obtain resultant granules for manufacturing the friction material.

4. A method of manufacturing granules according to claim 3, further comprising the step of adding water at the granulating step.

5. A method of manufacturing granules of raw material according to claim 4, wherein all steps are executed in one mixer continuously.

6. A method of manufacturing granules according to claim 4, wherein the crushing step comprises cutting and breaking the primary granules with a rotary blade mixer.

7. The method according to claim 3 further comprising the steps of:
    preforming the resultant granules; and
    heat-forming the resultant granules.

8. A substance used for manufacturing a friction material comprising:
    a plurality of granules sufficient for producing the friction material;
    wherein the granules are structured to have a plurality of fibers extending from a surface of each of the plurality of granules so as to enable entanglement of adjacent granules when the adjacent granules are compressed for manufacturing the friction material and wherein the shape of granules includes angled protrusions.

9. A method of manufacturing granules for manufacturing a friction material comprising the steps of:
    providing substantially spherical granules that are operative for use in manufacturing a friction material; and
    crushing the substantially spherical granules so as to obtain non-spherical resultant granules for manufacturing a friction material.

10. A method of manufacturing granules of raw material according to claim 4, further comprising the step of adding water to the mixture of fiber, powder and binder prior to the granulating step.

* * * * *